United States Patent

Cook

3,705,293

Dec. 5, 1972

[54] HIGH-CAPACITY OPTICAL IMAGE SCANNING MEMORY SYSTEM AND CARD VERIFICATION SYSTEM

[72] Inventor: Melvin S. Cook, Upper Saddle River, N.J.

[73] Assignee: Holobeam, Inc., Paramus, N.J.

[22] Filed: Dec. 21, 1970

[21] Appl. No.: 100,004

[52] U.S. Cl..235/61.7 B, 235/61.12 N, 235/61.12 R, 235/61.11 E, 250/219 D, 340/149 A

[51] Int. Cl. ............................................G06k 7/08

[58] Field of Search .235/61.12 N, 61.11 G, 61.12 R, 235/61.11 E, 61.7 B; 340/146.3 AA, 146.3 B, 173 CC, 173 LT, 149 A; 250/219 D, 219 DC

[56] References Cited

UNITED STATES PATENTS

| | | | |
|---|---|---|---|
| 3,471,684 | 10/1969 | Berezov | 235/61.12 R |
| 3,289,172 | 11/1966 | Towle | 235/61.11 E |
| 2,922,987 | 1/1069 | Haugk | 340/173 LT |
| 3,562,494 | 2/1971 | Schmidt | 250/219 D |
| 3,206,592 | 9/1965 | Nadler | 235/61.12 R |

*Primary Examiner*—Thomas A. Robinson
*Attorney*—Sandoe, Hopgood & Calimafde

[57] ABSTRACT

A memory storage and readout system using a camera as an optical image scanning device operating on the image of a mask which has a pattern formed thereon corresponding to the stored data. Addresses on the mask or its image for data storage correspond to specific locations in the pattern formed on the memory mask. In one embodiment, grey areas are regularly arranged between data areas on the mask to provide clocking signals to the addressing and readout circuits. Also disclosed is a personnel identification and credit card checking system utilizing this memory.

8 Claims, 4 Drawing Figures

INVENTOR.
MELVIN S. COOK

BY

Sandoe, Hopgood & Calimafde
ATTORNEYS

INVENTOR.
MELVIN S. COOK

BY

Sandoe, Hopgood & Calimafde
ATTORNEYS

HIGH-CAPACITY OPTICAL IMAGE SCANNING MEMORY SYSTEM AND CARD VERIFICATION SYSTEM

The present invention relates generally to memories, and more particularly to an optical read-only memory utilizing camera image scanning as a readout technique.

A memory is one of the basic components of most information processing equipment. Generally speaking, a memory for such equipment consists of data, usually stored in binary form at definite addresses or locations in the memory, which can be read out and utilized by the equipment in processing information. In a read-only memory, such as the one disclosed herein, the data is initially stored in the memory at the time of its fabrication in a pattern determined by the eventual utilization of the memory.

Core memories commonly employ saturable ferrite cores arranged in an addressable grid or matrix pattern, the magnetization given to each core determining the data state at that core. Ferrite core memories are relatively expensive and, moreover, require relatively large volumes for storing the high volume of stored data that is often required. Recently, high-capacity MOS memories fabricated by LSI techniques have been developed. MOS memories are expensive solutions for storing large amounts of data because of the limited number of bits that can be stored on a single memory chip or wafer, and the complex addressing schemes that must be utilized are also subject to loss of the memory of stored data if a power interruption occurs.

The complexity of the circuitry necessary to address and read out data from core and semiconductor memories serves to increase the cost of such memories and to decrease both achievable data storage density and the reliability of the memory. There is a need in the data processing field for a low-cost memory capable of inexpensively storing large amounts of data in a manner permitting ready reading out of data from the memory by the use of relatively low-cost and simple equipment.

Optical type memories storing data in patterns of opaque and translucent areas that represent information bits or storing data holographically in the form of interference patterns offer potentially large capacity data storage due to the high density with which information can be optically stored. Past efforts aimed at exploiting this potential for high density information storage using opaque and translucent bit storage pattern type memories have involved the use of a point source of light sequentially deflected or otherwise positioned to a unique set (or address) of information areas, and the previously stored data is read out a bit at a time using a photodetector to detect light reflected from the bit pattern stored information.

The present invention differs from the previous types of optical memory systems in that it is the effects produced by the optical image of a pattern type optical memory that are electronically or electromagnetically scanned by a camera, as opposed to the prior art in which typically direct scanning of the memory was performed such as by using a deflected point source of light to interrogate the memory in conjunction with one or more separate photodetectors to detect light reflected from the memory itself. In the present invention, a television type camera or other suitable camera type optical image scanning device could be used to derive data from the optical image of the optical pattern memory.

The use of a camera tube type device to scan the optical image of an optical pattern memory allows the use of beam deflection coils or deflection plates to scan the image and thus gives a relatively inexpensive solution for reading out data from the optical image of a densely packed optical pattern memory with extremely high resolution. No separate photodetector external to the camera is required and it is not necessary to direct a focused light from a point source onto the pattern memory, which is technically difficult and is usually a relatively slow interrogation technique. Further, use of a camera type scanning device, as opposed to an array of separate photodetectors, allows use of scan synchronization and registration data encoded on the optical pattern memory in conjunction with electronic or electromagnetic focusing means of the camera to provide proper data registration with the scan (even where, as in a film type memory, some shrinkage might have taken place in film development) and thus avoids data registration problems that could otherwise be encountered if the scanning device could not focus into image locations that are possibly variable in position with respect to the scanning device. It is further an advantage to have a memory system where the addressing scheme used to read data out of the memory is directly applicable to display of the data on a cathode ray tube.

Various types of cameras can be utilized in the memory system of the present invention. One such type utilizes an image dissector tube which can be considered as a specialized electronically or electromagnetically deflectable photomultiplier. Inside its envelope, a photocathode emits electrons from each area in proportion to the intensity of illumination from an optical image incident on that area. That is, an electron equivalent image is emitted from the photocathode corresponding to the optical image focused on the faceplate. These image electrons are focused into a plane containing a defining aperture and scanned across this aperture by means of deflection coils or deflection plates. At any particular instant of time, only the electrons passing through the aperture enter the electron multiplier and are collected by the anode. The size of the aperture is chosen for the desired maximum or limiting resolution. Resolution in an image dissector is improved over beam scanned tubes as the image orthicon, for example, because the electron beam in beam scanned tubes is not well defined in comparison with the sharply defined aperture in image dissectors. Thus, image dissectors are capable of using memory masks of greater data density than beam scanned tubes when designed for this purpose.

Another type of camera tube that can be used in the present invention is the image orthicon. In the image section of an image orthicon, a light image incident on the translucent photocathode liberates photoelectrons into the adjacent vacuum region in proportion to the light intensity on each element of the cathode. These photoelectrons are accelerated toward and magnetically focused onto the surface of a thin semiconducting target. Electrons strike this target with sufficient energy to liberate a larger number of secondary electrons for each incident primary. The secondary electrons are collected by a mesh closely spaced from the target membrane. Hence, by the depletion of electrons from the thin membrane, incremental areas become positive in proportion to the number of photoelectrons striking each element.

In the scanning section, an electron gun generates a highly apertured electron beam from a fraction to tens of microamperes in intensity. A solenoidal magnetic-focus coil and saddle-type deflection coils surrounding the scan section focus this beam on the insulator target and move it across the target. Scan-beam electrons impinge on the target at very low velocity, giving rise to relatively few secondary electrons. The target acts somewhat as a retarding field electrode and reflects a large number of the beam electrons that have less than average axial velocity.

If the elemental area on the target is positive, then electrons from the scanning beam deposit until the charge is neutralized. If the elemental area is at cathode potential (corresponding to a dark picture area), no electrons are deposited. In both cases the excess beam electrons are turned back and focused into an electron multiplier. The charges existing on either side of the semiconductive target membrane will, by conductivity, neutralize each other in less than one frame time. Electrons turned back at the target form a return beam that has been amplitude-modulated in accordance with the charge pattern of the target.

Other types of camera tubes can be utilized including the vidicon, the storage vidicon, plumbicon, sicon, and the like. Whereas the image dissector is not an integrating device, many of the other types of camera tubes do integrate the signal and would not be appropriate, therefore, for a random access type memory - but rather would have to be regularly scanned in a definite sequential pattern.

One application for a memory of this type is as part of a credit card verification system or a personnel identification security system, in which each credit card subscriber or employee is provided with a card assigned to him. When the use of the card is attempted, such as to make a purchase or to gain access into a restricted security area, a determination is made that the individual is the proper holder of the card. Systems of this type are shown, for example, in co-pending U.S. Pat. applications Ser. No. 745,465, entitled Credit Card System, and Ser. No. 867,192 entitled Secure Personnel Access Control System, both of which are assigned to the assignee of this application.

To add to the usefulness of these verification systems, it is desired to determine whether, for example, the owner of the credit card still has a proper credit rating, or whether his credit is no longer good. Similarly, in a security system, an additional check should be made, for example, to prevent a former employee, who is no longer authorized to enter the premises, from gaining access by using his now invalid security identification card. To permit this additional check at a plurality of spaced locations at which the identification card may be used, a larger number of data storage memories must be provided. The need for these memories using core or MOS memories significantly adds to the cost and complexity of the verification equipment and this factor of cost has heretofore limited the possible widespread use of such verification systems.

It is thus an object of the invention to provide a high-capacity memory of the type described which can be employed to great advantage in a data verification system.

It is another object of the invention to provide a memory of the type described which can be interrogated by a relatively simple electromagnetic scanning technique.

It is yet another object of the invention to provide a high-capacity, low-cost memory in which addressing and data readout operations are accurately performed by a high-resolution scanning technique applied to an image of a memory mask.

It is still another object of the invention to provide a memory in which precise synchronization between memory readout and addressing is achieved.

It is a further object of the invention to provide an optical memory in which synchronization signals for memory scanning are derived from the memory itself.

It is yet a further object of the invention to provide an optical memory in which the position of the memory storage mask may be varied without causing data registration problems.

It is still a further object of the invention to provide an optical memory insensitive to possible shrinkage of the memory mask.

Briefly stated, the memory of the present invention is in the form of a mask in which a data pattern is formed in accordance with a preset arrangement. Stated more precisely, the memory mask of the invention includes a matrix or pattern formed such as in a pattern of a plurality of intersecting rows and columns, an address location being defined at each row-column intersection. At each thus defined address location, a data bit is established as a dot, typically in one of two distinct shades, e.g., black or white, corresponding, for example, to the two binary levels "1" and "0". If the data is stored in a more general digital format, shades of grey or different colors could be used for data coding.

The mask is optically imaged onto the sensitive face of an optical image scanning tube such as, for example, an image dissector tube or a vidicon. If a vidicon is utilized, when its scanning beam is directed to a selected one of the address locations on a stored charge image of the mask formed on the face of the vidicon from an optical image of the memory mask, the data level at the thus interrogated memory address location is read out. The data read out by the vidicon from the memory in this manner corresponds to the memory image illumination level on the vidicon at the interrogated address location; that is, where data is encoded in binary format on the memory mask, for an interrogated area of high charge density in the vidicon, the data output may be a logic "1" bits, and for an interrogated area of low charge density the data read out from the memory is a logic "0" bit. A vidicon type scanning device destroys the data formed by charge storage in the vidicon at the address read, and the data must be allowed to reconstitute itself prior to being read again. This is due to the nature of a vidicon which is a charge storage device based upon a photoconductive effect. The vidicon by its nature, therefore, is most useful when read in a regular periodic scan pattern. An image dissector tube is useful when random access to memory data is desired since it is not based on an integrating type phenomenon requiring a more-or-less definite time to operate before interrogation can take place but rather is based on a photoemissive phenomenon.

In one aspect of the invention, timing or clock signals for use in finding an address of the memory are derived from the memory mask itself in order to provide accurate synchronism between the scanning and addressing of the memory, to thereby ensure that the correct area on the memory is being interrogated at the time that data is read out from the memory.

As herein disclosed, one means on the memory for producing clock signals is in the form of a grey area formed on the mask between the data, i.e., black or white, areas. When the scanning beam is incident on a grey area, a clock pulse is produced which is applied to the scanning beam control circuit to accurately control the position of the scanning beam. Such grey areas can also be used to provide feedback information to assist in attaining proper registration of the scanning of the camera tube, for example, with the location of the pattern of data on the memory mask.

As herein disclosed, the memory of the invention can be employed to great advantage in a data verification system wherein data concerning a great number of individuals, such as credit card holders or employees in a security location, is to be quickly and accurately verified. The data stored at each memory address reflects pertinent data of each individual such as his credit standing, employment status, individual identification data, income level and the like. By addressing the scanning device to the particular address location of the image of the memory uniquely assigned to an individual, the information desired for that individual can be quickly and unambiguously determined or verified.

To the accomplishment of the above and to such further objects as may hereinafter appear, the present invention relates to a high-capacity memory substantially as defined in the appended claims and as described in the following specification taken together with the accompanying drawings in which:

The memory mask of the invention utilizes optical and digital techniques to provide high-capacity data storage. The optical image of the memory can be addressed either by sequential or random-access techniques in an accurate manner. The data is stored in visual form on a memory film or mask such as that generally designated 10 in FIG. 1. As therein shown, the memory is arranged in the form of a matrix consisting of a plurality (e.g., 500) of rows, intersecting with a plurality (e.g., 500) of columns. The intersection of each row and column on the matrix defines a memory area or address location such as that designated 12 in FIG. 1. In a memory including 500 rows and 500 columns, 250,000 such memory areas are defined.

Data may be stored in binary form at each memory address location on the mask by forming either a dark or light region at that location to correspond the data stored there-at to one of the two binary levels, to wit, "1" and "0." Thus, at the time the memory mask 10 is fabricated, a preselected data pattern is stored therein by selectively forming each memory area on the mask as either a dark or a light spot.

Figure 1:
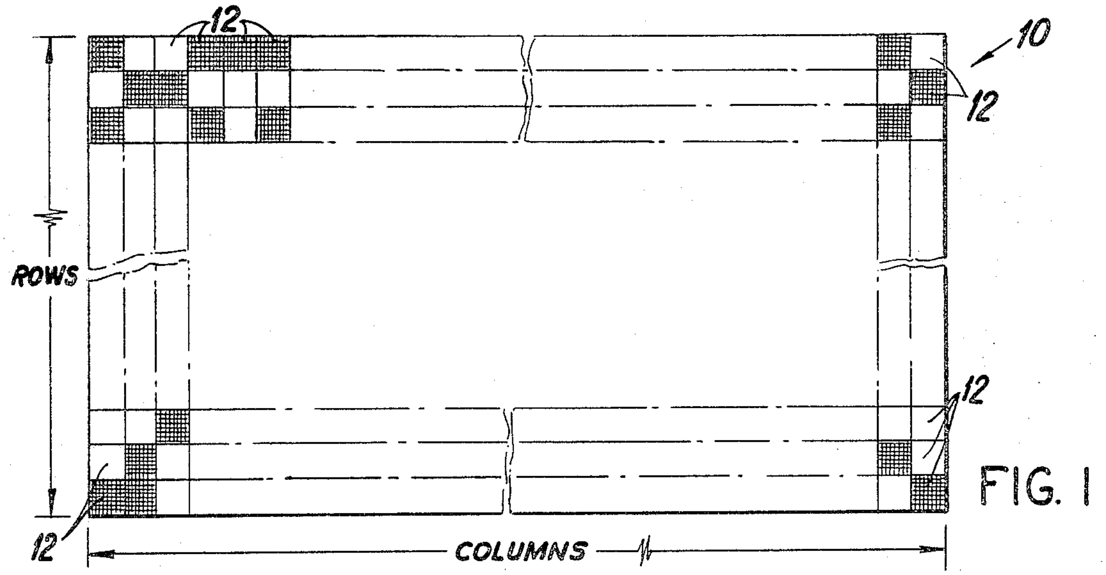
FIG. 1 is an illustration of a typical memory mask illustrating features of the invention.
Figure 2:
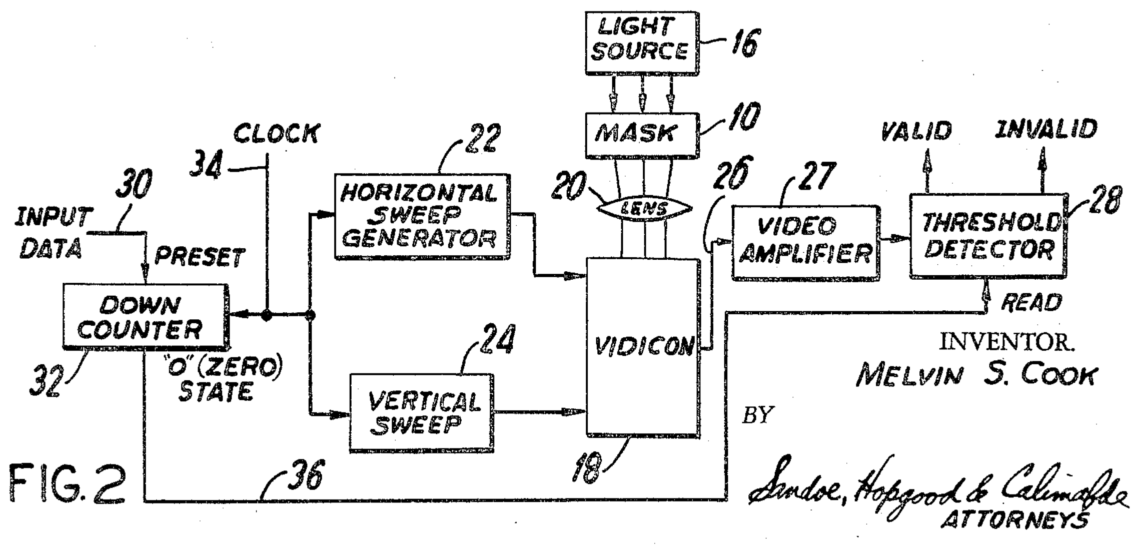
FIG. 2 is a schematic diagram in block form of a data verification system illustrating features of the invention.

A typical application of the memory mask 10 of FIG. 1 is shown in FIG. 2 which schematically illustrates a data verification system of the type in which a go (valid) or no-go (invalid) indication or information with which to interrogate a card bearer is produced in response to an input code word. A typical system of this type is a credit card verification system in which the status of the card is to be rapidly checked at the point of purchase. It is, however, to be understood that the optical memory of the invention may be used to equal advantages in other applications as well.

As shown in FIG. 2, a binary coded memory mask 10 is interposed between a light source 16 and the face of a camera type image scanning and detecting device here shown as a vidicon 18. If desired, an optical system represented by a lens 20 may be positioned between the memory mask 10 and the photoconductive region of the vidicon 18 to better image the memory mask 10 on the photocathode of the vidicon 18. As is well know, a well-defined, narrow electron beam produced within the vidicon is caused to scan over the photoconductive screen in a regular scan pattern under the control of horizontal and vertical sweep signals derived respectively from horizontal and vertical sweep generators 22 and 24. As is well known, light falling on the vidicon photoconductive face causes the electrical conductivity of the film at different locations to vary in accordance with the light intensity incident thereon. As the electron beam scans over the thus-affected photoconductive areas on the film, the beam deposits a sufficient electrical charge to return each area of the film to the vidicon cathode potential. As a result of this process, a signal or current flow is produced at a signal line 26 which is a function of the rate of scan of the electron beam and the surface potential at discrete areas on the photoconductive vidicon area, the latter in turn corresponding to the incident optical image illumination intensity level at these discrete areas formed by illuminating and imaging the memory mask 10 onto the photocathode of the vidicon 18.

The signal from the vidicon 18 on line 26 thus corresponds to the data stored on mask 10. By synchronizing the vidicon electrical output with the address on the image being interrogated by the vidicon scanning beam, the data content of each data area 12 on the memory mask can be determined. That is, the memory mask of FIG. 1 is addressed or interrogated by directing the scanning beam in vidicon 18 onto the vidicon photocathode area which is the image location in direct correspondence to the memory mask address location defined, as noted above, by a specified row-column intersection on the memory mask. Line 26 is coupled through a video amplifier 27 to a threshold detector 28, which produces in response to the amplified input video signals, a chain of pulses at one of two discrete levels depending on whether the input video signal is above or below a certain threshold level. The pattern of those binary pulses produced by detector 28 thus corresponds to the pattern of dark and light spots on the memory mask 10.

In the operation of the data verification system of FIG. 2, data of an individual credit card bearer whose rating is to be validated, is inserted over an input line 30 to a counter 32 which is initially set at zero, to thereby insert into counter 32 a count uniquely identifying the credit card holder. Counter 32 is arranged to count input clock pulses obtained from a clock pulse line 34 in a down direction. When counter 32 counts down to its initial zero condition, a read enable signal is produced at a read line 36 which is in turn coupled to the enable input of threshold detector 28. When detector 28 receives a read signal from counter 32, it outputs a signal at one of the binary levels, here represented as either a "valid" or "invalid" signal.

The clock pulses are also applied to the horizontal and vertical sweep control generators 22 and 24, which may include known circuitry for converting the clock pulses to a ramp sweep signal, to thereby cause the vidicon scanning beam to incrementally sweep in both the horizontal and vertical directions in a regular pattern along the image of the memory mask formed on the vidicon screen. In this manner, synchronism between beam scanning and data readout is achieved, such that the output indication produced by detector 28 accurately reflects the credit rating data stored at the addressed memory location, which memory location corresponds to the count initially stored in counter 32 and thus the data indicates the credit rating of the individual credit-card owner identified by the initial entry into the counter 32. Thus, for example, if the memory address location on the memory mask for the credit-card holder, which is interrogated in the manner just described, is opaque, a "valid" or "accept" indication is provided, and if that address location is transparent, an "invalid" or "reject" indication is provided. Obviously, this assignment of states to the stored data may be reversed without affecting the principles of the operation of the system of FIG. 2. Further, it is possible to store data known only to the true owner of the credit card and to output such data in order to interrogate the card bearer to see if he is the true card owner and thus enable a more positive identification to be made. Other types of data can be stored such as may be appropriate to a personnel access control system. It will be appreciated that in order to obtain accurate synchronism between the counter and the vidicon scanning beam, there must be sufficient linearity in the scanning beam control signals derived from sweep generators 22 and 24.

Figure 3:
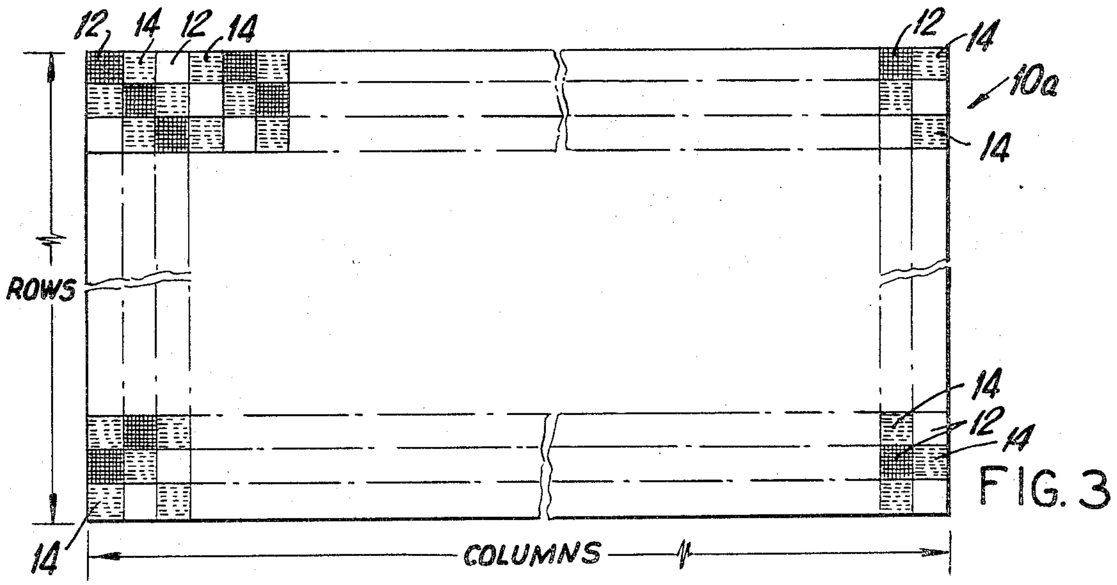
FIG. 3 is a modified memory illustrating the incorporating of clocking areas thereon.

FIG. 3 illustrates a modification of the memory mask of FIG. 1 in which clocking information is derived from data stored in the memory mask itself, rather than from external clock pulses, as will be described more completely with respect to the data verification system illustrated in FIG. 4. As shown in FIG. 3, the mask generally designated 10a, includes as before, a plurality of intersecting rows and columns defining at each of their respective intersections an address location 12. As in the mask of FIG. 1, the data stored at each address location is coded by being either dark or light (or transparent or opaque) corresponding to which of the binary levels "1" or "0" is to be stored at the particular address location. In contrast, however, to the mask 10 of FIG. 1, the mask 10a of FIG. 3, also includes "grey" areas 14 of an intermediate transmissivity arranged between each of the data areas 12 on the mask. As shall be described, grey areas 14 are utilized to produce signals that are used to clock the vidicon electron beam sweep circuit to ensure accurate synchronism between the beam scanning and the down counter, to thereby prevent the occurrence of errors in synchronization that could occur in the system of FIG. 2 if possible nonlinearities in the horizontal or vertical sweep generators are excessive.

Figure 4:
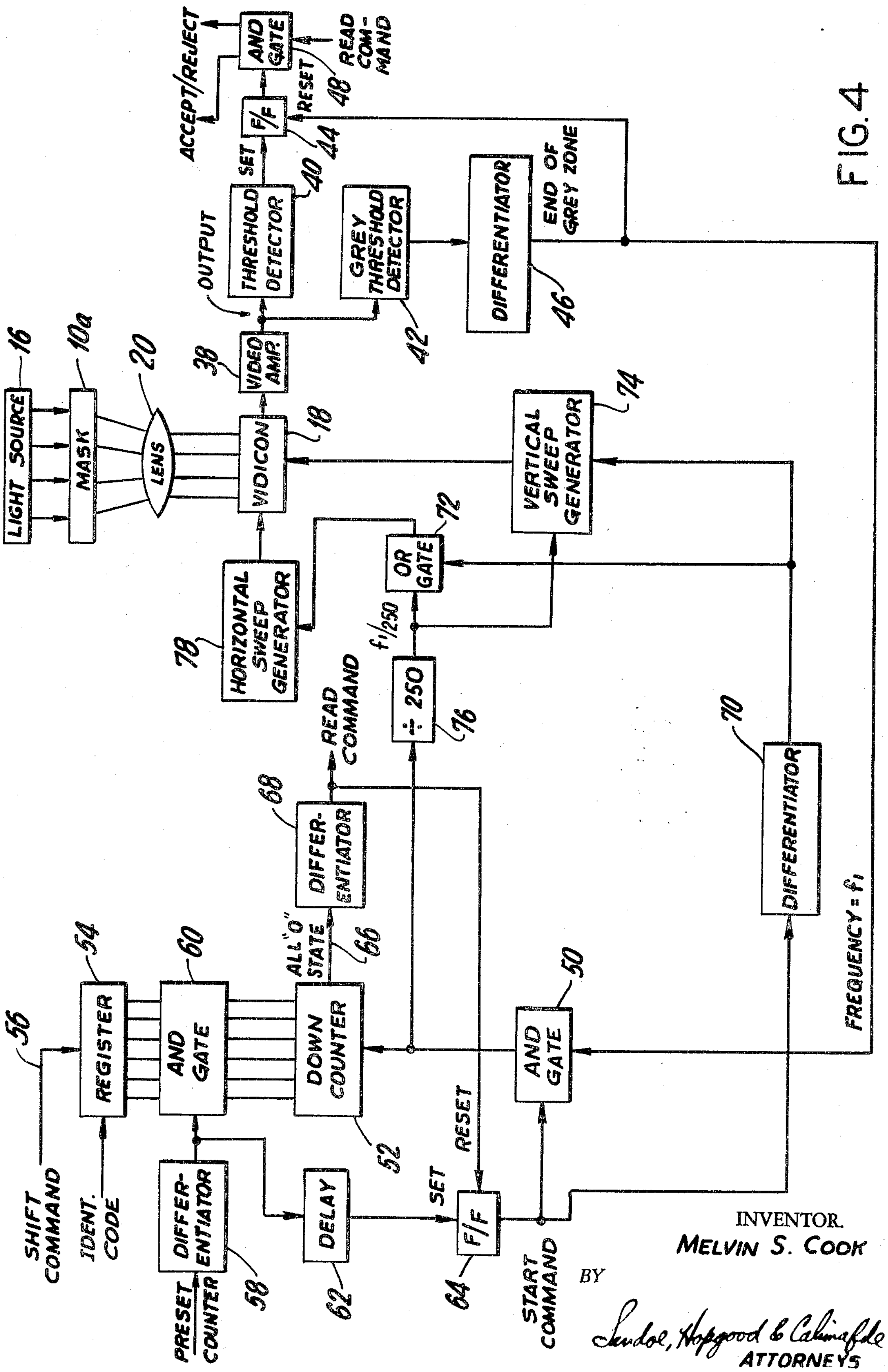
FIG. 4 is a schematic diagram in block form of another data verification system employing the memory of FIG. 3.

To this end, in the system of FIG. 4, a clock or synchronizing pulse is produced each time the vidicon electron beam is incident on an area of the stored charge image of the memory mask in the vidicon in correspondence to a grey area 14 of the optical image of the mask. Those clock pulses are employed, in a similar manner to the system of FIG. 2, to count down the input identification binary address word stored in a down counter, and to incrementally reposition the electron beam over the stored charge image of the memory mask formed on the photoconductive area of the vidicon.

Thus, as shown in FIG. 4, the memory mask 10*a* is arranged between a light source 16 and a vidicon 18 such that an image of the data pattern on the mask is formed through a lens system 20 onto the photoconductive layer of vidicon 18 much as in the manner of the system of FIG. 2. The signal plate of vidicon 18 is coupled to the input of a video amplifier 38, the output of which is applied both to a "white" threshold detector 40, and to a "grey" threshold detector 42. Detector 42 includes circuitry for detecting and producing an output signal when the input signal is above a first preset level and below a second preset level. The output of detector 40 is applied to the set terminal of a flip-flop 44, and the output of detector 42 is coupled to a differentiator 46.

The output of differentiator 46 is coupled to the reset terminal of flip-flop 44, the output of which is in turn coupled to one terminal of an AND gate 48. The differentiated output of grey detector 42, which is a series of pulses at a frequency of $f_1$, is applied to one input of an AND gate 50, the output of which is in turn coupled to the down control terminal of a counter 52.

In the data certification system of FIG. 4, an input binary word, such as a credit card holder's identification code, is initially applied in binary form into a shift register 54 under the control of a shift command signal at a line 56. Once register 54 is fully loaded with the input word, a preset counter signal is applied to a differentiator 58 which thereupon supplies a pulse to one input of an AND gate 60. Upon the appearance of this pulse, gate 60 is enabled and the contents of register 54 are thereupon inserted through that gate into counter 52.

The output pulse of differentiator 58 is also passed through a delay 62 which provides a sufficient time period to ensure that the identification code is completely stored in counter 52. The delayed pulse is applied to the set terminal of a flip-flop 64, the output of which is applied to the other input of gate 50. The all "0" state line 66 of counter 52, which is enabled when the count in counter 52 is zero, is applied to a differentiator 68. The latter, when zero line 66 is enabled, produces a read command signal which is coupled to the reset terminal of flip-flop 64 and to a terminal of gate 48.

The output of flip-flop 64 is also coupled to a differentiator 70 which produces a pulse that is applied to one input of an OR gate 72 and to the set terminal of a vertical sweep generator 74. The clock pulse output of gate 50 is also coupled to a frequency divider, here shown as a 250:1 counter 76, the output of which is coupled both to a second input of OR gate 72 and to vertical sweep generator 74. The output of OR gate 72 is coupled to a horizontal sweep generator 78, and the outputs of the vertical and horizontal sweep generators are respectively coupled to the conventional vertical and horizontal beam control elements of vidicon 18 to control the scanning of the vidicon beam over the memory mask image.

In the operation of the system of FIG. 4, the loading of counter 52 with the identification code causes flip-flop 64 to be set and differentiator 70 to apply a pulse to set vertical sweep generator 74 to an initial or reset position, and to apply, through OR gate 72, a pulse to horizontal sweep generator 78 to initiate the operation of the latter, causing the electron beam to sweep horizontally along the first row on the memory mask image. Each time that beam is incident on a grey area on the memory image, that is sensed by grey threshold detector 42, which, in response, produces a signal that is shaped by differentiator 46 to produce a chain of synchronizing pulses. Those pulses are passed through AND gate 50 to counter 52 so long as flip-flop 64 remains in the set condition. Each synchronizing pulse received at counter 52 reduces the stored count in that counter by one.

Those pulses are also counted in counter 76 which produces an output synchronizing signal for every 250 synchronizing pulses (the end of each line). The synchronizing signal is applied to both the vertical and horizontal sweep generators to cause the former to shift the beam to begin scanning over to a new line, and to cause the latter to begin a new horizontal scanning operation across the newly established vertical beam position. When counter 52 is counted down to "0," the read command signal is produced at line 66, which signal is differentiated and applied to gate 48 and flip-flop 64 to enable the former and reset the latter.

When flip-flop 64 is reset in this manner, gate 50 becomes disabled so that no further clock pulses are applied to counters 52 and 76. As a result, beam scanning is effectively terminated since generators 74 and 78 receive no further synchronizing signals. The read command signal at gate 48 causes the state of flip-flop 44 to be sensed as either an accept or reject (valid or invalid) signal depending on the state of that flip-flop. That state is determined by the output signal from threshold detector 40 which is at one of two discrete levels, depending on the transmissivity of the last data area scanned on the memory mask prior to the last-scanned grey area. That last data area is located at an address location corresponding to the identification code initially stored into counter 52.

It will be thus appreciated that synchronization between the scanning beam and the counter 52 has been accurately achieved by means of synchronizing pulses produced in response to the grey synchronizing areas provided directly on the memory mask itself, without the requirement of an external source of clock signals.

The memory of the present invention is thus highly suitable for use in any application requiring a low-cost, high-capacity memory. The memory mask may be fabricated by simple inking or photographic techniques. The memory mask may be larger in size than the vidicon photocathode by the use of an optical focusing system such as that shown as lens 20, which produces a reduced-size image of the memory mask on the vidicon. To further increase the size of the initial mask for greater ease in fabrication and improved resolution, the mask may be initially formed by inking or similar techniques, and a reduced size photographic transparency may then be made of the mask.

When certain vidicons are used as the image scanning tube, as herein specifically disclosed, the memory data pattern could consist of 500 lines with 500 resolution spots per line, to thereby provide a data storage potential of 250,000 data bits or address locations in the memory. If the memory mask 10a of FIG. 3 containing the grey synchronizing bits is employed, that potential is reduced by approximately one-half, but this reduction in potential memory capacity is compensated for by the improved and simplified scan synchronizing and registration that can be achieved.

Vidicons and other image-scanning devices may be fabricated with defective areas on the photosensitive regions thereon. Those defective areas may be identified at the time of manufacture of the vidicon and the areas of the vidicon that are interrogated or the memory mask may be modified accordingly to prevent the interrogation of defective areas of the vidicon, during the operation of the memory.

While the memory has been herein disclosed as being sequentially addressed, it can also be employed to advantage in a random-access memory by the use of an image dissector tube as the image scanning 47 device and by scanning the tube first in one direction (e.g., horizontally) and then in a perpendicular direction (e.g., vertically), until photoemissive current from the selected area on the memory mask image is focused through the tube aperture into the multiplier portion of the tube. The level of incident illumination at that area may be interrogated and read out in the manner described hereinabove. This type of random access is possible when scanning with an image dissector tube because it is not an integrating device such as stored charge devices as vidicons, orthicons, plumbicons, and the like.

Higher speed random access can be achieved by using varying shades of grey. The the greater the number of grey shades used the more address information is available and the lower the search time needed. If the system of FIG. 4 were employed, as many grey threshold detectors would be required as the different grey shades used, where each grey detector would add an appropriate step voltage to the horizontal sweep amplifier, thus stepping the scan to the appropriate horizontal position. The same could be done with the vertical sweep generator. This would enable the location of any X,Y coordinate in the grid in three clock intervals with enough shades of grey: the first stepping of the horizontal beam position to its appropriate grey shade; the second stepping of the vertical beam to its appropriate grey shade and the next clock pulse to its appropriate data coordinate. As large numbers of grey shades may not be practical at the present state of technology, a reasonable number can be selected.

Digital-to-analog converters can be used to establish step functions and the vertical and horizontal sweeps can be converted to variable step staircase generators to step through the appropriate shades of grey rather than read all clock and data positions.

While the memory system of this invention is essentially a read-only permanent storage, the data at any area can be readily modified by darkening a light area, e.g., by the use of a pen, or by lightening a previously dark area by removing a dot from the desired area. Similarly, a modest capacity auxiliary memory such as a small magnetic core memory or semiconductor memory could be employed to provide rapid correction and updating of the permanent storage memory of the present invention. In the alternative, the memory mask could be readily replaced in the system by a new memory mask placed in position between the light source and vidicon.

The memory system of the present invention could employ several memory masks of the type described with suitable means for placing a selected one of the memory masks into the proper position for interrogation or a cassette with a continuous strip of film could be used in order to expand the data storage capacity of the memory system.

The memory mask as herein disclosed may either have areas of two degrees of opacity or transmissivity, or could, in an alternative design, be opaque with holes punched through or ink removed from selected areas on the mask. To determine the status of the memory at any time, when desired, the mask may be interrogated as described above, and the read out data may be transmitted on a bit-by-bit basis to an external computer or to a cathode ray tube display unit where the mask could be displayed on the face of the cathode ray tube and then photographed.

Other suitable image scanners as multi-scan beam or multi-aperture corner tubes could be used to supply a check of data being read by requiring correlation between the data output from each anode. It is also apparent that many degrees of memory mask opacity (or light intensity in image address locations) can be used in the present memory system invention disclosed to encode data.

Thus, while only several embodiments of the invention have been herein specifically described, will will be apparent that modifications may be made therein all without departing from the spirit and scope of the invention.

I CLAIM:

1. A high capacity memory mask comprising a mask having a pattern arranged thereon in which data is stored at a plurality of address locations at a corresponding plurality of areas having preselected first and second levels of light transmissivity corresponding to the data stored thereat, and a plurality of control areas arranged intermediate adjacent ones of said data-storing areas and each having a third light transmissivity differing from that of said data-storing areas, light responsive means, means for forming an image of said mask on said light responsive means, means for scanning said image and for producing signals at levels corresponding to the relative light transmissivities of said data and control areas, and means coupled to said signal producing means for producing a series of control signals in response to signals derived from said control areas, and means coupled to said control signal producing means and said image scanning means for directing the former to a specified one of said data-storing areas in response to said control signals.

2. The combination of claim 1, further comprising counting means, means for inserting an identification binary word into said counting means, means for coupling said control signal producing means to said counting means, said counting means including means for producing a read signal when the number of said control signals applied thereto reaches a predetermined relationship to said identification word, and readout means coupled to said sensing means for producing an output data signal when said read signal is received thereat.

3. A memory system comprising a data storage device in which data is stored at one of first and second discrete levels at data areas defined on said device in a predetermined storage pattern, said data areas each having a preselected one of first and second light affecting characteristics corresponding respectively to one of said first and second discrete levels, said data storage device further comprising control areas having a third light affecting characteristic intermediate said first and second light affecting characteristics, means for forming an optical image of said data storage device on a light-sensitive surface, scanning means including means for directing a light beam over said light-sensitive surface, readout means responsive to said scanning means for producing a series of data signals corresponding to the data stored at the scanned areas of said surface, counter means, means for inserting a code binary word into said counter means, means for applying clock pulses to said counter means corresponding to the position on said image being scanned by said beam, means for enabling said readout means when the counted number of said clock pulses bears a predetermined relationship to said code binary word, and means responsive to said control areas coupled to said counter means and said beam directing means for producing said clock pulses.

4. The system of claim 3, in which said data storage device is in the form of a film having areas of first and second levels of light transmissivity corresponding to said first and second light affecting characteristics formed in a predetermined pattern thereon, said image forming means including a light source incident on one surface of said film.

5. The system of claim 4, in which said image forming means further comprises means interposed between an opposed surface of said film and said image-forming surface for focusing the image of said film on said image-forming surface.

6. A memory system comprising a data storage device in which data is stored at one of first and second discrete levels at data areas defined on said device in a predetermined storage pattern, said data areas each having a preselected one of first and second light affecting characteristics corresponding respectively to one of said first and second discrete levels, said data storage device further including control areas having a third light affecting characteristic different from said first and second light affecting characteristics arranged between adjacent ones of said data areas, said memory system further comprising means for forming an optical image of said data storage device on a light-sensitive surface, means for scanning said light-sensitive surface, means responsive to said scanning means for producing a series of data signals corresponding to the data stored at the scanned areas of said surface, and means coupled to said scanning means and responsive to said control areas for producing control signals for controlling the operation of said scanning means.

7. A data verification system comprising a data storage device in which data is stored at one of first and second discrete levels at data areas defined on said device in a predetermined storage pattern, said data areas each having a preselected one of first and second light affecting characteristics corresponding respectively to one of said first and second discrete levels, said data storage device further including control areas having a third light affecting characteristic different from said first and second light affecting characteristics arranged between adjacent ones of said data areas, said memory system further comprising means for forming an optical image of said data storage device on a light sensitive surface, means for scanning said light-sensitive surface, means responsive to said scanning means for producing a series of data signals corresponding to the data stored at the scanned areas of said surface, means coupled to said scanning means and responsive to said control areas for producing control signals for controlling the operation of said scanning means, counter means for storing an input code word for verification, means for coupling said control signals to said counter means, the latter being effective when the number of said applied control signals bears a predetermined relation to said input code word to produce an output command signal, output means coupled to said counter means and said data signal producing means and effective when the output command signal is produced by said counter means to provide a data readout signal corresponding to one of said first and second discrete levels, and means for applying said control signals to said scanning means to control the operation of the latter to cause accurate scanning of said image in response to said control signals.

8. The data verification system of claim 7, in which said data signal producing means includes first threshold detecting means coupled to said light-sensitive surface for producing data signals at one of two levels when the light level at the scanned area of said light-sensitive surface corresponds to the image of the data areas of said data-storage device, said control signal producing means including second threshold detecting device coupled to said light-sensitive surface for producing a control signal in response to the scanning of the image of one of said control areas.

* * * * *